United States Patent [19]

Schwarze

[11] Patent Number: 5,425,196
[45] Date of Patent: Jun. 20, 1995

[54] FISHING BAIT HOLDER

[75] Inventor: Donn F. Schwarze, Wisconsin Rapids, Wis.

[73] Assignee: Magic Products, Inc., Amhurst Junction, Wis.

[21] Appl. No.: 299,515

[22] Filed: Sep. 1, 1994

[51] Int. Cl.6 ............................................. A01K 97/04
[52] U.S. Cl. ....................................... 43/54.1; 43/57.1;
220/23.4; 206/504; 206/315.11; 224/920;
224/252
[58] Field of Search .................. 220/23.83, 23.86, 23.4,
220/212.5; 206/430, 427, 504, 315.11; 224/253,
252, 269, 920; 215/228; 43/54.1, 55, 57.1

[56] References Cited

U.S. PATENT DOCUMENTS

| 2,548,080 | 4/1951 | Thorn | 224/920 |
| 3,115,287 | 12/1963 | McGrew | 224/920 |
| 4,231,605 | 11/1980 | Newman | 220/23.83 |
| 4,509,639 | 4/1985 | Thompson | 220/23.4 |
| 4,955,516 | 9/1990 | Satterfield | 224/901 |
| 5,337,907 | 8/1994 | McKenzie | 206/427 |

Primary Examiner—P. Austin Bradley
Assistant Examiner—James Miner
Attorney, Agent, or Firm—Ryan, Kees & Hohenfeldt

[57] ABSTRACT

A device for attaching fishing bait to a supporting surface such as a belt worn around a fisherman's waist includes a hook which is attached to a flexible strap. The strap has a pair of opposed broad sides, each of which are juxtaposed to a lid. The lids and the strap are secured to each other by a mechanical fastener passing through a central opening in each of the lids and an end of the strap. The lids are provided with threads for engagement with jars of fishing bait. Preferably the strap is formed of a flexible fabric and the hook is connected to a buckle passing through the strap, the hook being rotatably attached to the buckle.

4 Claims, 2 Drawing Sheets

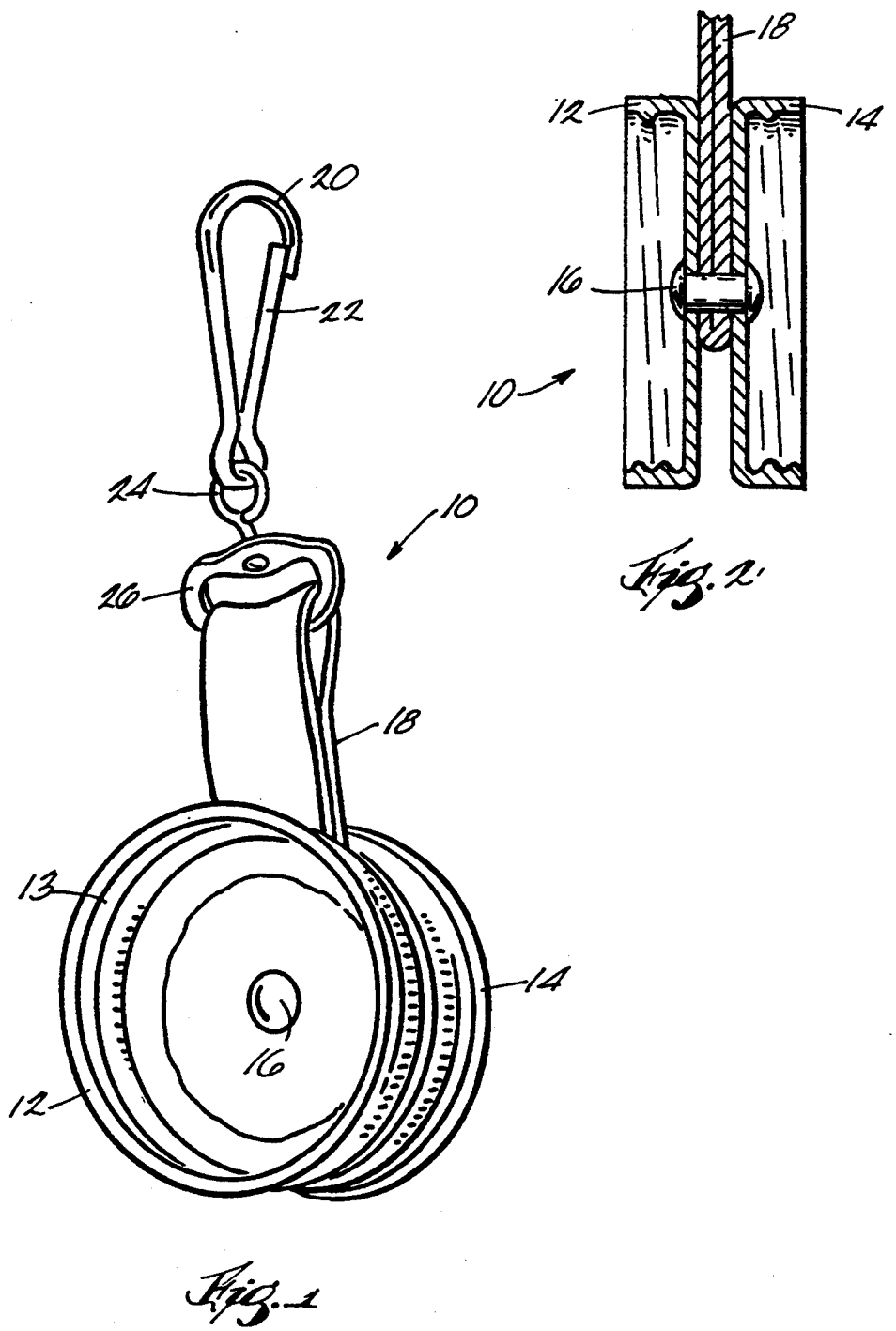

FISHING BAIT HOLDER

FIELD OF THE INVENTION

This invention relates to a device for containing bait for fishing. More specifically, the invention relates to a device for holding one or two bait jars and which is fastenable to a fisherman's belt or other supporting surface.

BACKGROUND OF THE INVENTION

Many devices have been provided for convenient carrying of baits and tackle for fishing. Such devices have included conventional tackle boxes, compartmentalized plastic containers, minnow buckets and the like.

Various baits such as fish eggs, grubs, artificially compounded bait nuggets are utilized for fishing. Many of such types of baits are stored in small glass or plastic jars and are closed by means of a threaded lid. A need has existed for a convenient way for sportsmen to carry such bait Jars.

SUMMARY OF THE INVENTION

It is a principal object of the present invention to provide a convenient way to retain and transport one or two standard size bait jars. In accordance with an important aspect of the invention, a holder is provided with a clip for attaching the same to a belt loop or other article of clothing such as a button hole, clothing strap or the like. The clip also can be utilized to attach the bait to another surface such as a tackle box, a boat, a minnow bucket, or a shoulder strap.

In accordance with a further aspect of the invention, the strap and clip are secured to bait jar covers or lids of conventional dimensions. This arrangement enables either one or two standard bait jars to be attached to the covers.

Briefly, the invention provides a device for attaching fishing bait to a supporting surface such as a belt worn around a fisherman's waist which includes a hook which is attached to a flexible strap. The strap has a pair of opposed broad sides, each of which are juxtaposed to a lid. The lids and the strap are secured to each other by a mechanical fastener passing through a central opening in each of the lids and an end of the strap. The lids are provided with threads for engagement with jars of fishing bait. Preferably the strap is formed of a flexible fabric and the hook is connected to a buckle passing through the strap, the hook being rotatably attached to the buckle.

Further aspects and advantages of the invention will become apparent from the following detailed description, claims and accompanying drawings.

BRIEF DESCRIPTION OF THE DRAWINGS

FIG. 1 is a perspective view of a bait jar supporting device of the present invention;

FIG. 2 is a central cross-sectional view of the device of FIG. 1; and

DETAILED DESCRIPTION OF A PREFERRED EMBODIMENT

Figure 3:
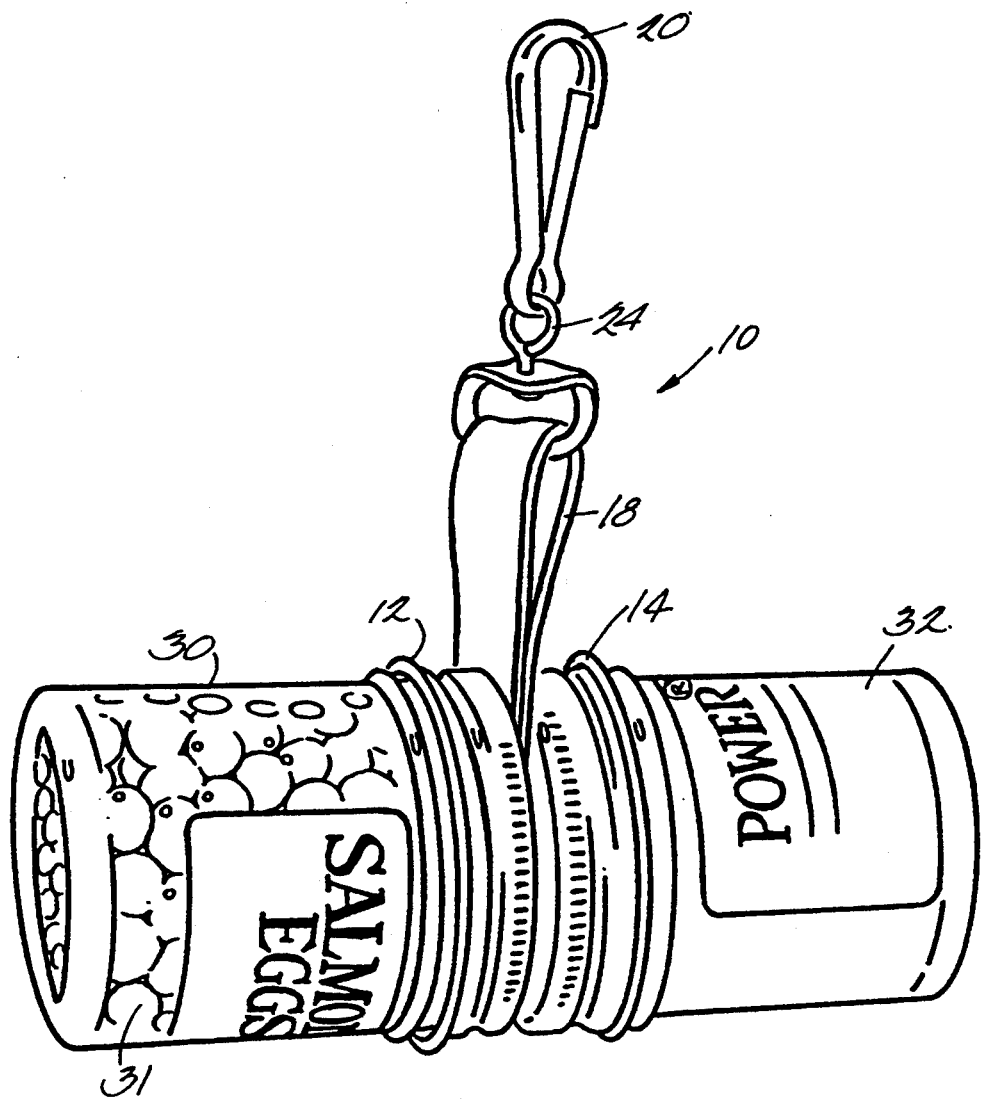
FIG. 3 is a perspective view of the device of this invention with two bait jars attached thereto.

Referring more specifically to the drawings, there is seen a bait holder device generally indicated by numeral 10. Holder 10 includes a pair of threaded lids 12 and 14 provided with threads 13 adapted to engage standard size bait jars of the type conventionally available in bait shops.

Lids 12 and 14 are attached to each other through their central axis by means of a fastener 16. Fastener 16 is shown to be a rivet. However, fastener 16 can also be in the form of a cotter pin, a bolt or a locking fastener. Preferably the fastener passes through an opening which allows the two threaded tops 12 and 14 to be rotated relative to each other. Sandwiched between lids 12 and 14 is a strap 18 which may be formed from leather or fabric. Strap 18 is provided at its outer end with a hook 20. Hook 20 is preferably provided with a spring biased closure member 22 which enables opening of hook 20 for insertion onto a belt, suspender, or other supporting surface conveniently. Hook 20 is attached to strap 18 by conventional means such as an eyelet 24 which is in turn secured to a buckle 26 through which strap 18 is threaded. This mode of attachment enables the strap 18, together with any jars supported thereby to swivel relative to the hook 20.

As seen in FIG. 3, lids 12 and 14 can be threadedly attached to jars 30 and 32 which contain fish bait as illustrated. As illustrated, the bait may be in the form of fish eggs 31. However, any other well-known bait traditionally sold in small jars can be supported by device 10. Usually, different baits are contained in each of containers 30 and 32.

It will be readily apparent that, if desired, only one of the lids 12 or 14 can be attached to a jar, and thus the device can be utilized to support only a single jar instead of two jars. Once the jars are threaded to the lids 12 and 14, hook 20 can readily be attached to the wearer's belt or other article for support of the baits during fishing.

What is claimed is:

1. A device for attaching fishing bait to a supporting surface, said device comprising:
   a hook, said hook being attached to a flexible strap,
   said strap having a pair of opposed broad sides, each of said sides being juxtaposed to a lid,
   said lids and said straps being secured to each other by a mechanical fastener passing through a central opening in each of said lids and end of said strap,
   said lids being provided with threads for engagement with jars of fishing bait.

2. A device according to claim 1 wherein said strap is formed of a flexible fabric.

3. A device according to claim 1 wherein said hook is connected to a buckle passing through said strap, said hook being rotatably attached to said buckle.

4. A device according to claim 1 wherein said fastener comprises a rivet.

* * * * *